United States Patent
Gordon et al.

(10) Patent No.: US 12,174,845 B1
(45) Date of Patent: Dec. 24, 2024

(54) ANALYTIC QUERY PROCESSING USING A BACKUP OF A DATABASE

(71) Applicant: Amazon Technologies, Inc., Seattle, WA (US)

(72) Inventors: Nicholas Gordon, Seattle, WA (US); Akshat Vig, Medina, WA (US); Amit Purohit, Issaquah, WA (US); Ravi Math, Redmond, WA (US); Joseph Robert Idziorek, Seattle, WA (US); Christopher John Anderson, Danville, IN (US)

(73) Assignee: Amazon Technologies, Inc., Seattle, WA (US)

( * ) Notice: Subject to any disclaimer, the term of this patent is extended or adjusted under 35 U.S.C. 154(b) by 91 days.

(21) Appl. No.: 17/937,419

(22) Filed: Sep. 30, 2022

(51) Int. Cl.
*G06F 16/00* (2019.01)
*G06F 11/14* (2006.01)
*G06F 16/2458* (2019.01)

(52) U.S. Cl.
CPC ...... *G06F 16/2462* (2019.01); *G06F 11/1458* (2013.01); *G06F 2201/84* (2013.01)

(58) Field of Classification Search
CPC ............ G06F 16/2462; G06F 11/1458; G06F 2201/84
See application file for complete search history.

(56) References Cited

U.S. PATENT DOCUMENTS

| | | | | |
|---|---|---|---|---|
| 8,346,811 B2 * | 1/2013 | Wyatt | ................... | G06F 16/283 |
| | | | | 707/793 |
| 10,853,182 B1 * | 12/2020 | Vig | ......................... | G06F 16/23 |
| 10,929,246 B2 * | 2/2021 | Iyengar | ............... | G06F 11/1464 |
| 10,970,303 B1 * | 4/2021 | Denton | ................. | G06F 16/951 |
| 11,327,680 B2 | 5/2022 | Natanzon | | |
| 2014/0324782 A1 * | 10/2014 | Graefe | ................ | G06F 11/1471 |
| | | | | 707/646 |
| 2018/0196867 A1 | 7/2018 | Wiesmaier et al. | | |
| 2019/0278665 A1 * | 9/2019 | Raghuram | .............. | H04L 67/52 |
| 2019/0361915 A1 | 11/2019 | Weaver et al. | | |
| 2020/0241968 A1 * | 7/2020 | Thomsen | ............ | G06F 11/1471 |
| 2020/0372004 A1 * | 11/2020 | Barber | ....................... | G06F 7/08 |
| 2020/0409949 A1 * | 12/2020 | Saxena | .................. | G06F 16/285 |
| 2021/0026561 A1 * | 1/2021 | Ginzburg | ............. | G06F 3/0659 |
| 2021/0294703 A1 * | 9/2021 | Thomsen | ........... | G06F 11/1469 |
| 2022/0405331 A1 * | 12/2022 | Pal | ...................... | G06F 16/9024 |

OTHER PUBLICATIONS

U.S. Appl. No. 17/937,422, filed Sep. 30, 2022, Nicholas Gordon, et al.

* cited by examiner

*Primary Examiner* — Alexander Khong
(74) *Attorney, Agent, or Firm* — S. Scott Foster; Kowert, Hood, Munyon, Rankin & Goetzel, P.C.

(57) ABSTRACT

Queries may be made against a non-relational database without impacting the capacities of the non-relational database by enabling performance of queries to a non-relational database via an external query management, backup management, and a non-relational database backup hosted in an external data storage. The query management and backup management of the non-relational database service may split transactional load to the non-relational database and analytical load, and furthermore allow selection of a desired data freshness for queries including various time ranges, such as seconds, minutes, or days.

20 Claims, 10 Drawing Sheets

ANALYTIC QUERY PROCESSING USING A BACKUP OF A DATABASE

BACKGROUND

Non-relational databases offer flexible, high-performance storage solutions for data utilized by many different types of applications. Non-relational databases are databases that stores data in a schema-free or schema-on-read format. However, running analytics on the non-relational database systems while limiting its impact on processing capacities of the non-relational database poses a non-trivial challenge.

Figure 1:
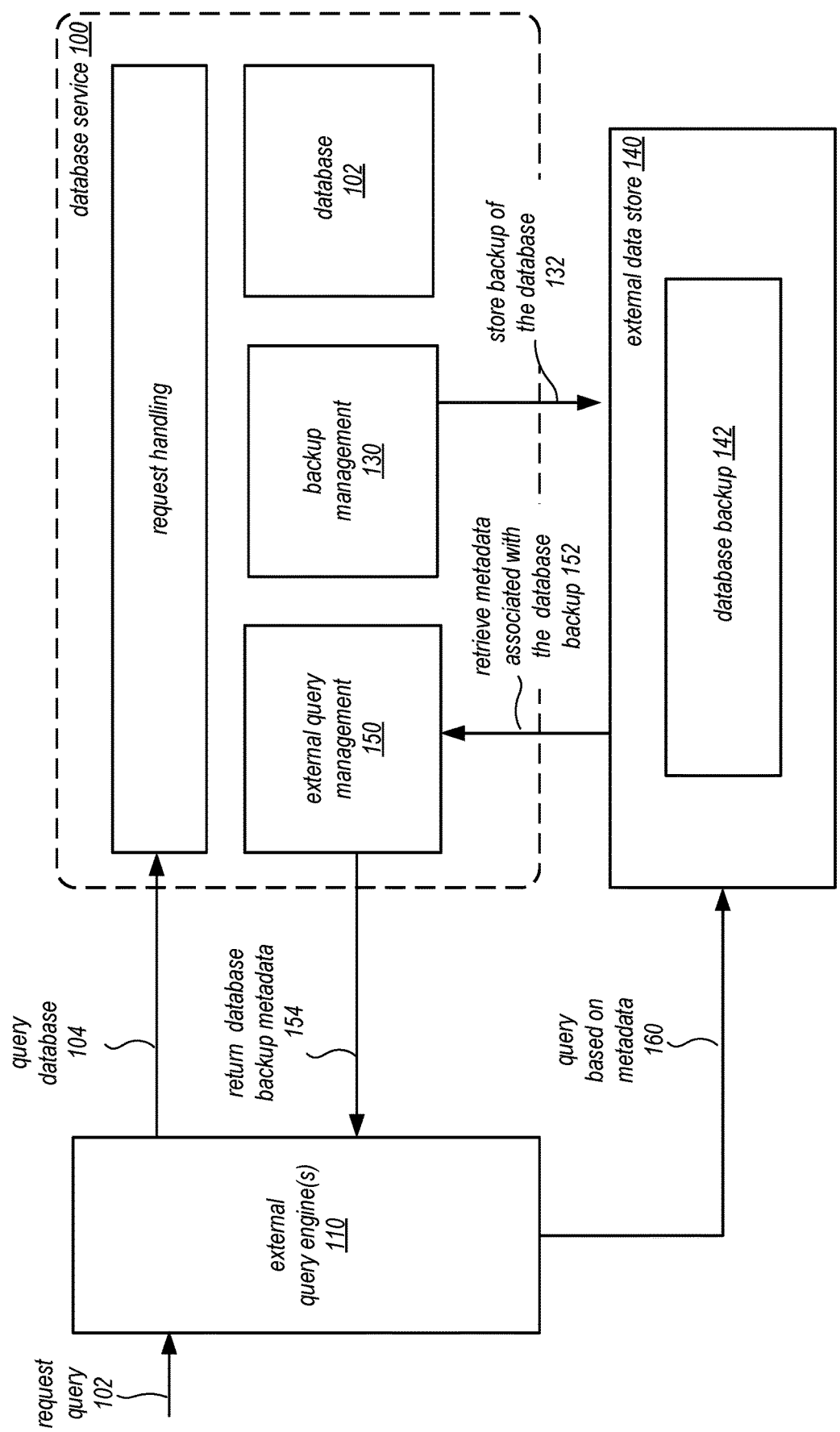
FIG. 1 is a logical block diagram illustrating enabling performance of queries to a database via an external query management, backup management, and a non-relational database backup hosted in an external data storage, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The techniques described herein may implement external query management and backup management that enables queries to a database to be performed via a backup of the database and refrain from consuming the database system capacity directly. Different types of database systems may take advantage of these techniques to support queries performed on a database backup for various purposes, such as analytic-style queries.

In some embodiments, one type of database may be a non-relational database. A non-relational database may provide advantages ranging from enabling the database to store and process large amounts of unstructured data-due at least in part to a lack of a predefined schema for the database. The lack of a schema enables a non-relational database to process various type of data without the need to modify its architecture. Non-relational databases may provide a flexible data model with the ability to easily store and combine data of any structure without the need to modify a schema. Non-relational databases may be used as data stores for data processing and storage of applications that operate at large scale and enable real-time execution of large numbers of database transactions by large numbers of people.

In some embodiments, another type of database may be relational databases. Relational databases may organize data into a set schema with one or more tables (or other relations) often with columns and rows, with unique keys identifying each row and provides indexing capabilities that enable faster query response times. Relational databases may be used for data processing and storage of applications that operate at large scale and enable real-time execution of large numbers of database transactions by large numbers of client applications. These transactions may include change, insertion, deletion, or query of data in the database.

Along with the operations supported by the different types of databases, analytics operations on a databases, such as various complex or long-running queries, may provide value and insights into the data maintained in the database. However, different types of databases may only support limited types of queries. For instance, some kinds of statistical operators, aggregate operators, or other analytical operators may not be supported by the database system that stores the database (or may be supported in an inefficient, time-consuming, or otherwise costly manner to perform). Furthermore, analytics queries to the database may be limited by the impact that such queries would have on other workloads of the database. For instance, a a transactional workload of the database could be detrimentally impacted if analytics queries were performed in addition to the the transactional workload.

While some techniques to separate analytical workloads from other workloads on a database utilize ETL (extract, transform, and load) pipelines or other infrastructure to maintain an updated copy of the database to handle the analytics workload in another database system (e.g., in database system suited for, or optimized for, analytics), techniques for external query management and backup management that enables queries to a database to be performed via a backup of the database, as described in various embodiments below, may provide both the additional analytics capabilities offered by another query engine without incurring the cost of creating and maintaining a separate copy in the other query engine (e.g., in a format specific to that query engine), such as may happen when utilizing ETL as noted above. A query management and backup management feature of a database system that directly connects backups of databases to analytics targets may be used to separate the analytical workloads from transactional workloads while maintaining data freshness (e.g., measurement of how up to date the data source of the query is). In some embodiments, a database system (e.g., through various features of query management and backup management) may enable analytic queries on a selected database. The database system may allow selection of a desired data freshness for analytic queries including various time ranges, such as seconds, minutes, or days.

FIG. 1 is a logical block diagram illustrating enabling performance of queries to a database via an external query management, backup management, and a database backup hosted in an external data storage, according to some embodiments. A database service 100 may be a network-based service (e.g., as discussed below with regard to FIG. 2) or a standalone server or application that stores and provides access to data. Various types of databases 102, storing various types of data may be implemented in different embodiments (e.g., SQL databases, NoSQL databases, document databases, key-value data stores, semi-structure or unstructured data stores, etc.). Access to the database 102 may be provided by different types of Application Programming Interface (APIs). For example, an API may be invoked to retrieve an item, or update the item, or add a new item. Alternatively, or additionally, various query languages or other access protocols may be supported to submit queries.

Database service 100 may implement request handling 104 to handle requests to query database data from clients. Clients may be another application, system, or device that generates requests, such as query language request to the database 104. Request handling 110 can perform or manage the performance of various requests, including query requests 104. In some embodiments, a backup management 130 may store a backup of the database 132 in an external data store 140 to create a database backup 142. The backup management 130 may provide continuous backups viable for analytics by external query engine(s) 110. The backup management 130 may ensure that backups of the database that is stored in the external data store 140 are flush and that when query to the database arrives, that the backup represents the current state of the table with a certain freshness time range, such as with data freshness of one minute or five minutes.

The backup management 130 may furthermore coordinate compaction of the database backup 142 such that future queries are efficient and fast enough to meet a threshold performance requirements of queries. In some embodiments, instead of data arranged according to timestamps, the database may be accessed by index key and then by respective timestamps to enable parallelized compaction. Various portions of the database may be split by key ranges such that the work may be distributed. Furthermore, in some embodiments, parallelized compaction may be performed incrementally for only the change logs of the database. In some embodiments, the backup of the database may be compacted fully with both the change logs and partitions of the database backup. In some embodiments, the backup management may provide sorting and indexing provided according to the file format, to enable efficient queries by key/key-range and timestamp. Furthermore, the backup management may and enables applications to execute a streamed merge of updates on read. In addition, the primary key and timestamp for each record can be read without deserializing the rest of the record so that applications can deserialize as little data as possible when merging updates. The backup management 130 of the database service 100 will be discussed in further detail below with regard to FIGS. 2-3. In some embodiments, the backup may be stored in a row-oriented format for a schema-less data using log structured merge tree (LSM-T) with a copy-on-write loss structure. The file format of the backup of the non-relational database service 100 will be discussed in further detail below with regard to FIGS. 4-5.

In some embodiments, the database service 100 may implement an external query management 150 that obtains relevant metadata of the backup to enable queries to be run on the backup of the database. Based on the query to the database 104 received, the external query management 150 may receive metadata associated with the database backup 152 associated with the query 104 and return the database backup metadata 154 to the external query engine 110.

In some embodiments, a query coordinator of the external query engine 110 may be responsible for planning a query, and query workers of the external query engine 110 may be responsible for the actual query processing and data processing, to perform the query based on the metadata 160 the database backup 142. The metadata may include partition information and query units which are individual independent units of work that that can be distributed across many of the query workers. The external query management 150 of the database service 100 will be discussed in further detail below with regard to FIGS. 2 and 6.

Please note that previous descriptions of obtaining query units to perform query handling of a database are merely provided as logical examples. Furthermore, please note that although this specification uses a non-relational database to illustrate implementing external query management and backup management that allows queries to a database to be performed via a backup of the database and refrain from consuming the database capacity, the type of database is not limited to non-relational databases—in some embodiments, a relational database (or other types of databases) may be used instead. This specification continues with a general description of a provider network that may implement a non-relational database service that may maintains a non-relational database backup to perform queries. Then various examples of a non-relational database service are discussed, including different components/modules, or arrangements of components/module, that may be employed as part of implementing the database service, in one embodiment. A number of different methods and techniques to implement performing queries on the non-relational database system are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
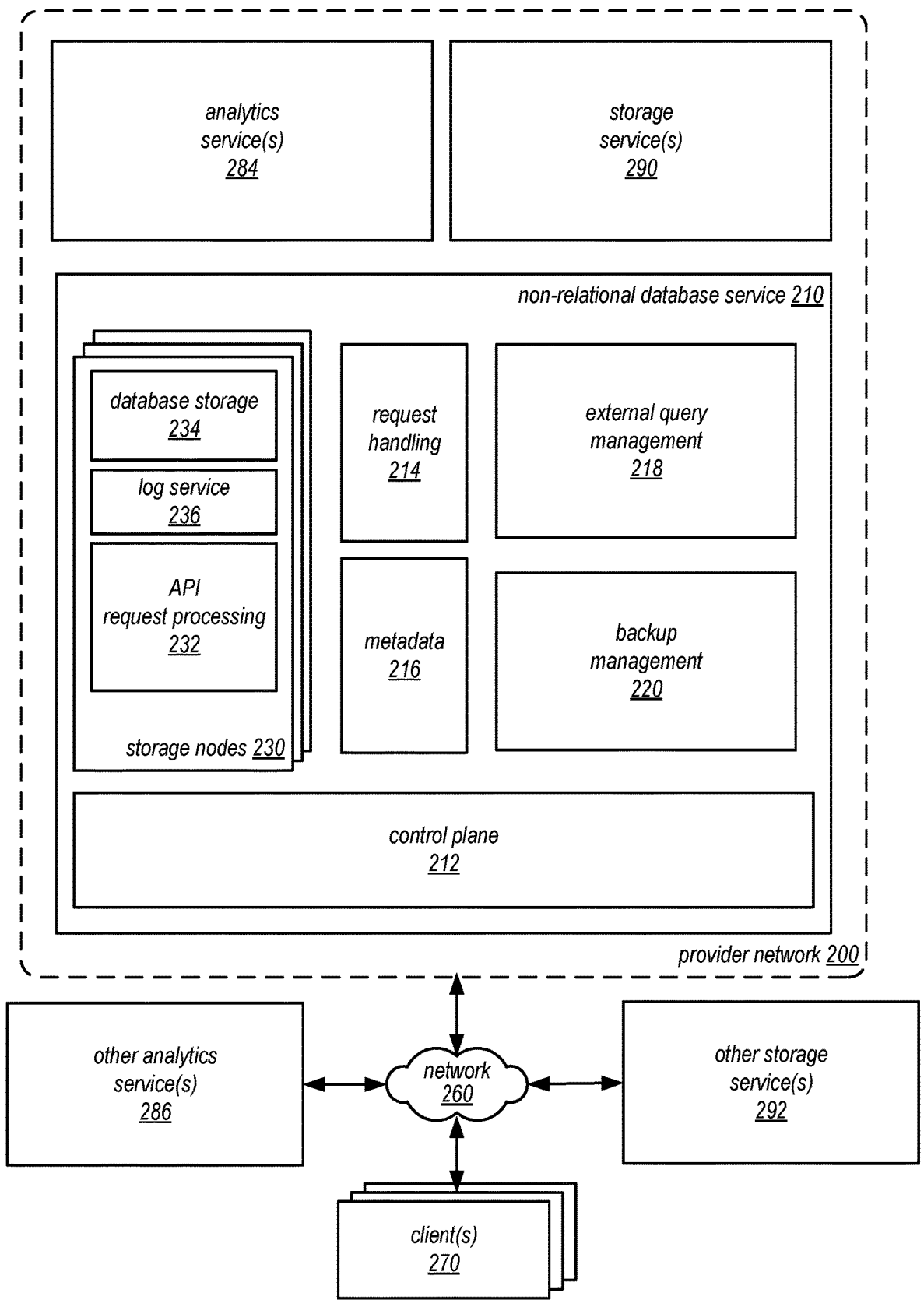
FIG. 2 is a logical block diagram illustrating a provider network that implements a non-relational database service that enables external queries to a non-relational database via a query management and backup management of the non-relational database service, according to some embodiments.

FIG. 2 is a logical block diagram illustrating a provider network that implements a non-relational database service that enables external queries to a non-relational database via a query management and backup management of the non-relational database service, according to some embodiments.

Provider network 200 may be a private or closed system, in one embodiment, or may be set up by an entity such as a company or a public sector organization to provide one or more services (such as various types of cloud-based storage) accessible via the Internet and/or other networks to clients 270, in another embodiment. In one embodiment, provider network 200 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and storage services offered by the provider network 200. In one embodiment, provider network 200 may implement various computing resources or services, such as non-relational database service(s) 210 (e.g., NoSQL databases, document databases, key-value stores, or other database services that do not require a pre-defined data model or structure (e.g. a relational structure) to be imposed upon data stored to perform queries or other access requests to the data), and other services (not illustrated), such as a map reduce service, data warehouse service, data flow processing service, and/or other large scale data processing techniques), data storage services (e.g., an object storage service, block-based storage service, or data storage service that may store different types of data for centralized access), virtual compute services, and/or any other type of network-based services (which may include various other types of storage, processing, analysis, communication, event handling, visualization, and security services).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in one embodiment, each of which may be similar to the computer system embodiment illustrated in FIG. 10 and described below. In one embodiment, the functionality of a given system or service component (e.g., a component of non-relational database service 210) may be implemented by a particular node or may be distributed across several nodes. In some embodiments, a given node may implement the functionality of more than one service system component (e.g., more than one data store component).

Non-relational database service 210 may include various types of non-relational database services, in one embodiment, for storing, querying, and updating data. Such services may be enterprise-class database systems that are highly scalable and extensible. In one embodiment, queries may be directed to a database in non-relational database service 210 that is distributed across multiple physical resources, and the database system may be scaled up or down on an as needed basis. The database system may work effectively with database schemas of various types and/or organizations, in different embodiments. In one embodiment, non-relational database service 210 may provide a RESTful programmatic interface in order to submit access requests (e.g., to get, insert, delete, or query data).

In one embodiment, clients 270 may encompass any type of client configurable to submit network-based requests to provider network 200 via network 260, including requests for non-relational database service 210 (e.g., to perform a query against the non-relational database hosted in an external storage service 290). For example, in one embodiment a given client 270 may include a suitable version of a web browser, or may include a plug-in module or other type of code module that executes as an extension to or within an execution environment provided by a web browser. Alternatively in a different embodiment, a client 270 may encompass an application such as a database client/application (or user interface thereof), a media application, an office application or any other application that may make use of a database in non-relational database service 210 to store and/or access the data to implement various applications. In one embodiment, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application that interacts directly with provider network 200, in one embodiment. In one embodiment, client 270 may generate network-based services requests according to a Representational State Transfer (REST)-style network-based services architecture, a document- or message-based network-based services architecture, or another suitable network-based services architecture. Note that in some embodiments, clients of database service(s) 210 may be implemented within provider network 200 (e.g., applications hosted on a virtual compute service).

In one embodiment, a client 270 may provide access to provider network 200 to other applications in a manner that is transparent to those applications. For example, client 270 may integrate with a database on non-relational database service 210. In such an embodiment, applications may not need to be modified to make use of the storage system service model. Instead, the details of interfacing to the non-relational database service 210 may be coordinated by client 270.

Client(s) 270 may convey network-based services requests to and receive responses from provider network 200 via network 260, in one embodiment. In one embodiment, network 260 may encompass any suitable combination of networking hardware and protocols necessary to establish network-based-based communications between clients 270 and provider network 200. For example, network 260 may encompass the various telecommunications networks and service providers that collectively implement the Internet. In one embodiment, network 260 may also include private networks such as local area networks (LANs) or wide area networks (WANs) as well as public or private wireless networks. For example, both a given client 270 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client(s) 270 and the Internet as well as between the Internet and provider network 200. It is noted that in one embodiment, client(s) 270 may communicate with provider network 200 using a private network rather than the public Internet.

Non-relational database service 210 may implement request handling 214, in one embodiment. Request handling 214 may receive and authenticate queries or other access requests, among other things, in one embodiment. For example, in one embodiments, non-relational database service 210 may implement a particular web services application programming interface (API) that supports a variety of operations on tables (or other collections of data objects)

that are maintained and managed on behalf of clients/users by the non-relational database service (and/or data stored in those tables/collections). In one embodiment, non-relational database service 210 may support different types of services requests. For example, in one embodiments, database service 210 may implement a particular web services application programming interface (API) that supports a variety of operations on tables (or other data objects) that are maintained and managed on behalf of clients/users by the data storage service system (and/or data stored in those tables), such as a request to perform a transaction that includes operations (e.g., requests to read, write, update, delete, add, or insert items in a table) with respect to one or multiple items across one or multiple partitions of a table hosted at one or multiple storage nodes. Similarly, a request may be a request to perform operations on individual items (e.g., requests to read, write, update, delete, add, or insert items in a table, according to a specified consistency level or characteristic). In one embodiment, request handling 214 may perform parsing and/or throttling of service requests, authentication and/or metering of service requests, dispatching service requests, and/or maintaining partition assignments that map storage nodes to partitions of tables hosted in non-relational database service(s) 210. In some embodiments, in addition to implementing API that support variety of operations on the database storage system of the non-relational database service 210, the API may support operations with respect to variety of operations on tables/items of the partitions of a backup non-relational database that are maintained in the storage service(s) 290.

In one embodiment, non-relational database service 210 may implement control plane 212 to implement one or more administrative components, such as automated admin instances which may provide a variety of visibility and/or control functions). Control plane 212 may provide visibility and control to system administrators, detect split events for partitions of tables at storage nodes, and/or anomaly control, resource allocation, in one embodiment. In one embodiment, control plane 212 may also include an admin console, through which system administrators may interact with database service 210 (and/or the underlying system). In one embodiment, the admin console may be the primary point of visibility and control for non-relational database service 210 (e.g., for configuration or reconfiguration of tables by system administrators). For example, the admin console may be implemented as a relatively thin client that provides display and control functionally to system administrators and/or other privileged users, and through which system status indicators, metadata, and/or operating parameters may be observed and/or updated. Control plane 212 may provide an interface or access to information stored about one or more detected control plane events, such as split requests to be processed, at non-relational database service 210, in one embodiment.

Control plane 212 may direct the performance of different types of control plane operations among the nodes, systems, or devices implementing database service 210, in one embodiment. For instance, control plane 212 may communicate with storage nodes to initiate the performance of various control plane operations, such as moves, splits, update tables, delete tables, create indexes, etc. In one embodiment, control plane 212 may include a node recovery feature or component that handles failure events for storage nodes 230 (e.g., adding new nodes, removing failing or underperforming nodes, deactivating or decommissioning underutilized nodes, etc).

In one embodiment, non-relational database service 210 may also implement a plurality of storage nodes 230, each of which may manage one or more partitions of a database table (or other collection of data items) on behalf of clients/users or on behalf of non-relational database service 210 which may be stored in database storage 234 (on storage devices attached to storage nodes 230 or in network storage accessible to storage nodes 230). The database storage 234 as well as an associated log service 236 may be used to maintain a non-relational database of the non-relational database service 210. In some embodiments, log service 236 may not be maintained in the storage nodes 230, but may be a separate service that provides a record of actions taken by the database. In some embodiments, the log service 236 may store records of actions on the database as events. The log service 236 may furthermore provide a continuous delivery of events to another storage service outside of the non-relational database service 210, such as storage service 290 and 292, in some embodiments.

Storage nodes 230 may implement API request processing 232, in one embodiment. API request processing 232 may create, update, define, query, and/or otherwise administer databases, in one embodiment. In one embodiment, API request processing 232 may handle requests to access the data (e.g., to perform transactions, to insert, modify, add, or delete data, and requests to query for data by generating query execution plans to determine which partitions of a database may need to be evaluated or searched in order to service the query). In one embodiment, API request processing 232 may also perform other management functions, such as enforcing access controls or permissions, concurrency control, or recovery operations.

In one embodiment, non-relational database service 210 may provide functionality for creating, accessing, and/or managing tables at nodes within a single-tenant environment than those that provide functionality for creating, accessing, and/or managing tables maintained in nodes within a multi-tenant environment. In another embodiment, functionality to support both multi-tenant and single-tenant environments may be included in any or all of the components illustrated in FIG. 2. Note also that in one embodiment, one or more storage nodes 230 process access requests on behalf of clients directed to tables. Some of these processing nodes may operate as if they were in a multi-tenant environment, and others may operate as if they were in a single-tenant environment. In some embodiments, storage nodes 230 that operate as in a multi-tenant environment may be implemented on different processing nodes (or on different virtual machines executing on a single host) than processing nodes that operate as in a single-tenant environment.

In addition to dividing or otherwise distributing data (e.g., database tables) across storage nodes 230 in separate partitions, storage nodes 230 may also be used in multiple different arrangements for providing resiliency and/or durability of data as part of larger collections or groups of resources. A replica group, for example, may be composed of a number of storage nodes maintaining a replica of a particular portion of data (e.g., a partition of a table) for the non-relational database service 210. Moreover, different replica groups may utilize overlapping nodes, where a storage node 230 may be a member of multiple replica groups, maintaining replicas for each of those groups whose other storage node 230 members differ from the other replica groups. In some embodiments, the replica of a non-relational database may be maintained as a backup non-relational database in the storage service 290.

In some embodiments, non-relational database service 210 may implement a non-relational data model may include tables (or alternatively collections) comprising items that have one or more attributes. In such embodiments, each table maintained on behalf of a client/user may include one or more items, and each item may include a collection of one or more attributes. The attributes of an item may be a collection of one or more key (or key)-value pairs, in any order, in some embodiments. In some embodiments, each attribute in an item may have a name, a type, and a value. In some embodiments, the items may be managed by assigning each item a primary key value (which may include one or more attribute values), and this primary key value may also be used to uniquely identify the item. In some embodiments, a large number of attributes may be defined across the items in a table, but each item may comprise a sparse set of these attributes (with the particular attributes specified for one item being unrelated to the attributes of another item in the same table), and all of the attributes may be optional except for the primary key attribute(s). In other words, the tables maintained by the database service 210 (and the underlying storage system) may have no predefined schema other than their reliance on the primary key, in some embodiments. Data in items may be nested, in some embodiments, such that an attribute that has a sub attribute which has a sub-sub attribute, etc. Moreover, in some embodiments, in addition to being arranged by index keys, the one or more items may be arranged according to respective timestamps to enable parallelized compaction. The non-relational database may be asserted by index key and then by respective timestamps. In some embodiments, the primary key and timestamp for each record can be read without deserializing the rest of the record so that applications can deserialize as little data as possible when merging updates.

Non-relational database service 210 may provide an application programming interface (API) for requesting various operations targeting tables, indexes, items, and/or attributes maintained on behalf of storage service clients. In some embodiments, the service (and/or the underlying system) may provide both control plane APIs and data plane APIs. The control plane APIs provided by non-relational database service 210 (and/or the underlying system) may be used to manipulate table-level entities, such as tables and indexes and/or to re-configure various tables These APIs may be called relatively infrequently (when compared to data plane APIs). In some embodiments, the control plane APIs provided by the service may be used to create tables or secondary indexes for tables at separate storage nodes, import tables, export tables, delete tables or secondary indexes, explore tables or secondary indexes (e.g., to generate various performance reports or skew reports), modify table configurations or operating parameter for tables or secondary indexes (e.g., by modifying the amount of throughput capacity, adding storage capacity for additional read replicas, splitting partitions or moving partitions), and/or describe tables or secondary indexes. In some embodiments, control plane APIs that perform updates to table-level entries may invoke asynchronous workflows to perform a requested operation. Methods that request "description" information (e.g., via a describeTables API) may simply return the current known state of the tables or secondary indexes maintained by the service on behalf of a client/user. The data plane APIs provided by non-relational database service 210 (and/or the underlying system) may be used to perform item-level operations, such as transactions, storing, deleting, retrieving, and/or updating items and/or their attributes, or performing index-based search-type operations across multiple items in a table, such as queries and scans, as well as various other operations pertaining to.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation (JSON) or ION), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

Non-relational database service 210 may include support for some or all of the following operations on data maintained in a table (or index) and/or a backup of the table by the service on behalf of a storage service client: perform a transaction (inclusive of one or more operations on one or more items in one or more tables), put (or store) an item, get (or retrieve) one or more items having a specified primary key, delete an item, update the attributes in a single item, query for items using an index, and scan (e.g., list items) over the whole table, optionally filtering the items returned, or conditional variations on the operations described above that are atomically performed (e.g., conditional put, conditional get, conditional delete, conditional update, etc.). For example, non-relational database service 210 (and/or underlying system) described herein may provide various data plane APIs for performing item-level operations, such as a TransactItems API, PutItem API, a GetItem (or GetItems) API, a DeleteItem API, and/or an UpdateItem API, as well as one or more index-based seek/traversal operations across multiple items in a table, such as a Query API and/or a Scan API.

Figure 3:
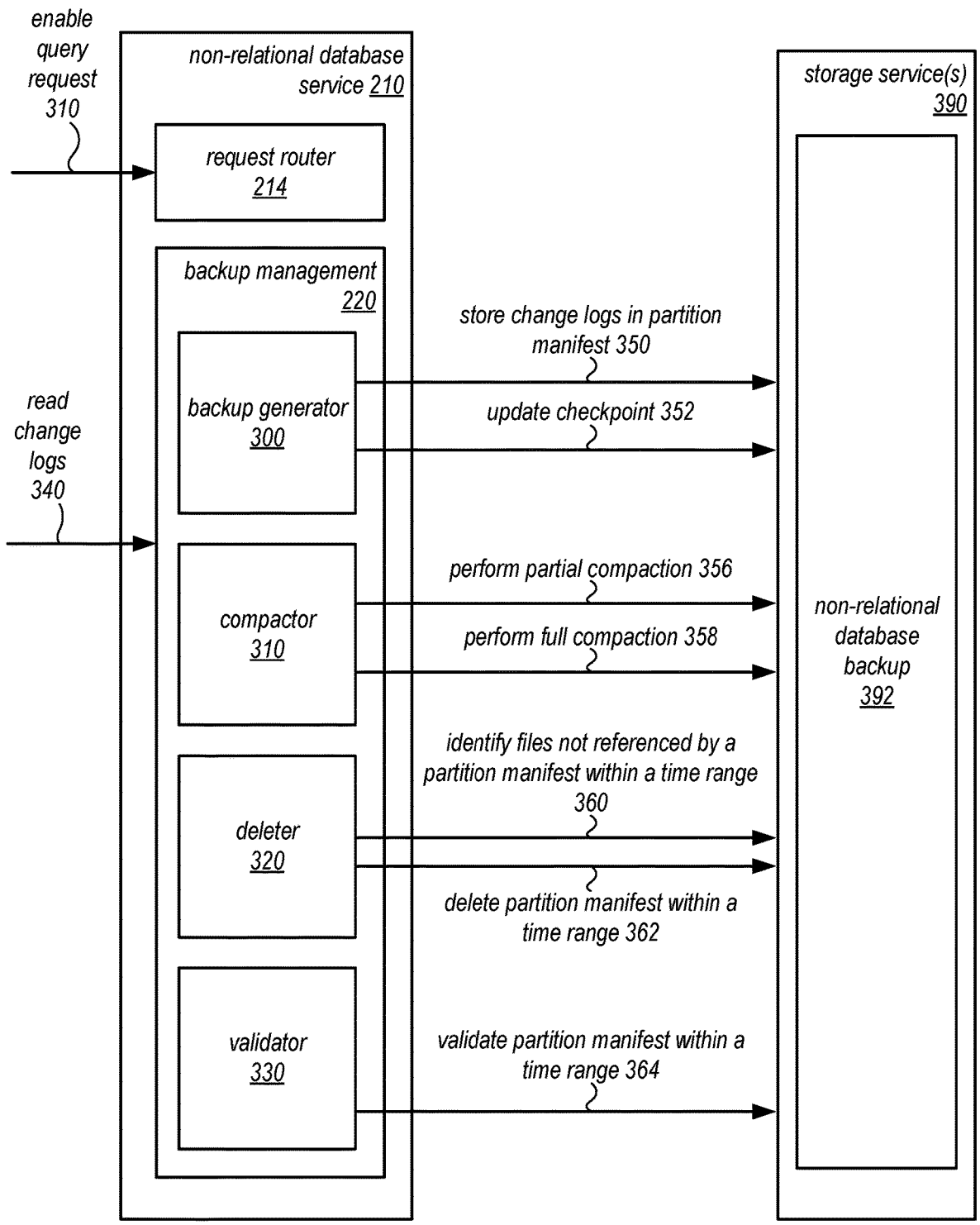
FIG. 3 is a logical block diagram illustrating backup management of a non-relational database service that enables generating and maintaining a backup of a non-relational database used to enable external queries to the non-relational database, according to some embodiments.
Figure 6:
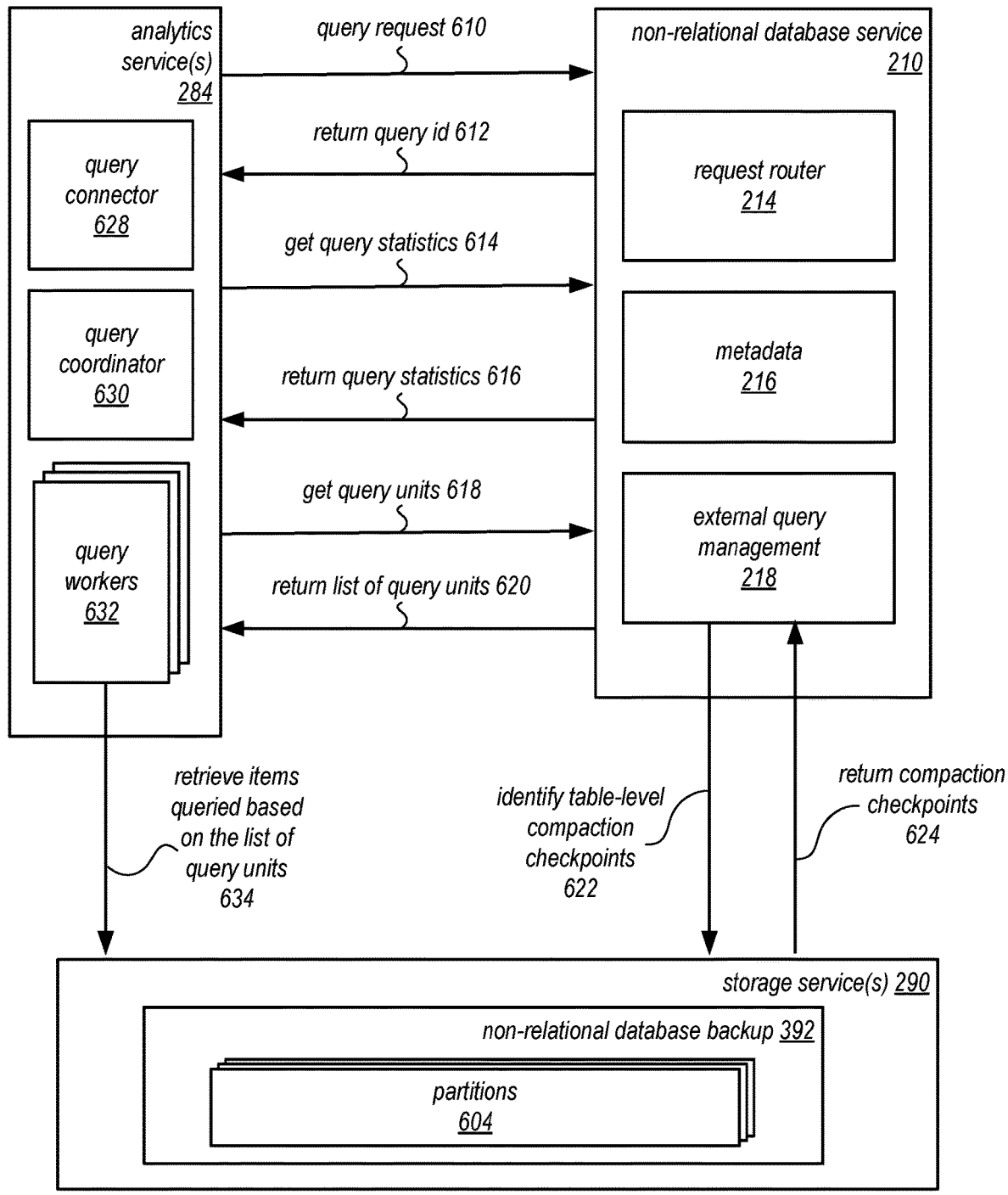
FIG. 6 is a logical block diagram illustrating external query management of a non-relational database service that enables performance of queries to a non-relational database via a non-relational database backup hosted in an external data storage, according to some embodiments.

Provider network 200 may implement analytics service(s) 284 which may be enabled by the external query management 218 and the backup management 220 to perform various data processing functions, as further discussed in FIG. 3 and FIG. 6. In various embodiments, analytics service(s) 284 may be various types of data processing services that perform general or specialized data processing functions (e.g., analytics, big data querying, time-series data, graph data, document data, relational data, non-relational data, structured data, semi-structured data, unstructured data, or any other type of data processing operation) over data that is stored across multiple storage locations, including the backup of the non-relational database stored in an storage service(s) 290 external to the non-relational database service 210 in some embodiments. In at least some embodiments, such services may be enterprise-class database systems that are scalable and extensible. Queries may be directed to a non-relational database that is distributed across multiple physical resources, as discussed below, and subsequently be enabled to perform the query in the storage service(s). The database system may work effectively with database schemas of various types and/or organizations, in different embodiments. In some embodiments, clients/subscribers may submit queries or other requests (e.g., requests to add data) in a number of ways, e.g., interactively via an SQL interface to the database system or via Application Programming Interfaces (APIs). In other embodiments, external applications and programs may submit queries using Open Database Connectivity (ODBC) and/or Java Database Connectivity (JDBC) driver interfaces to the database system. The storage services 286 in provider network 200 may be an object store or other type of data store for storing data. The analytics service(s) 284 may provide support for APIs for performing queries on the non-relational database, such as a DescribeQueryConfiguration API, UpdateQueryConfiguration API, StartQuery API, GetQueryStatistics API, GetQueryUnits API, GetQueryUnit API, GetQueryUnitStatistics API.

In some embodiments, other analytics service(s) 286 similar to the analytics service(s) 284 may be outside of the provider network 200 but may perform similar data processing functions on the backup non-relational database stored in the storage service(s) 290 through the external query management 218 and the backup management 220. In some embodiments, the backup of the non-relational database may be stored in other storage service(s) 292 outside of the provider network 200 such that the analytics service(s) 284 and other analytics service(s) 286 may perform queries via the other storage service(s) 292.

FIG. 3 is a logical block diagram illustrating backup management of a non-relational database service that enables generating and maintaining backup of a non-relational database used to enable external queries to the non-relational database, according to some embodiments. A non-relational database service 210 may receive an enable query request 310 via a request router 214 to enable a non-relational database to be allowed to be queried without impacting the capacities of the non-relational database stored in the non-relational database service 210. In some embodiments, based on the enable query request 310, a backup management 220 may generate backup to a storage service 390. In other embodiments, the backup management 220 may be defaulted to generating and maintaining a backup to the storage service 390, and the enable query request 410 may allow a query management of the non-relational database service 210 to receive a query.

In some embodiments, the backup management 220 may be comprised of a backup generator 300, a compactor 310, a deleter 320, and a validator 330. The backup management 220 may read change logs 340 of the changes made to the associated non-relational database and propagate/flush the changes such that the non-relational database backup 392 stored in the storage service 390 reflects a later point-in-time storage state. The backup generator 300 may comprise a per-partition handling and a per-collection handling component. The per-partition handling component of the backup generator may read change logs from the one or multiple storage nodes of the non-relational database service or a log service, convert them to files having format that is able to be sorted by index key and timestamp, upload them to the storage service 390, and produce a new partition manifest. In some embodiments, the partition manifest may comprise data files that form an LSM-T of the state of the partition within a range of time. In some embodiments, the partition manifest may reference a data file shared amongst other partition manifests only if the data file is referenced by the partition manifest immediately preceding it in order to simplify deletion operations of the partition. In some embodiments, the per-table handling component may identify the minimum archive time across all partitions and update a checkpoint 352 for the table. The backup generator may furthermore store change logs in partition manifest 350 according go the change logs that are read 340.

In some embodiments, the compactor 310 may read the partition manifests generated by the backup generator 310 and compact/re-write the manifest if the LSM-T represented by that manifest meets the criteria for compaction. In some embodiments the compactor 310 may perform a partial compaction 356 such that each log that comprises the writes from time range may be combined together to a single change log. For example, a change log may comprise various types of logs. For example, a squashed log may comprise the latest version of each item of the database mutated between a time range, and a versioned log may comprise the non-latest versions of each item mutated between that same time range. In some embodiments, the compactor 310 may incrementally compact these change logs such that each respective time ranges of the change logs will be merged together into a longer range. In other embodiments, the change logs as well as a snapshot of the backup may be compacted by performing a full compaction 358. In some embodiments, the compaction criteria may be based on a size-tiered compaction strategy.

In some embodiments, the deleter 320 may identify files that are not referenced by a partition manifests within a time range 360. The deleter 320 may delete partition manifests as they get colder at increments of certain time range 362. In some embodiments, the time range after which the delete will prune the partition manifests may be changed by the non-relational database service. Although, such deletion may require more data to be compacted in order for queries to points to a time in the past, the deletion may provide be a reasonable trade-off between cost and the speed to materialize colder data, in some embodiments.

In some embodiments, validator 330 may ensure that the necessary manifest and data files necessary to query the database backup over a certain range of time are durable. The validator 330 may validate partition manifest within a time range 364 to ensures that table manifests exist throughout the time range, that the partitions they reference cover the full key range of the table, and that the files referenced in the table/partition manifest exist. In some embodiments that do not use a table manifest, the metadata record associated with the respective partitions may be validated. In some embodiments, the validation process may comprise not just validation of the partition metadata, but may further comprise deeper durability checks of the database. In some embodiments, the validator 320 may periodically conduct a checksum of the database and the database backup.

Figure 4:
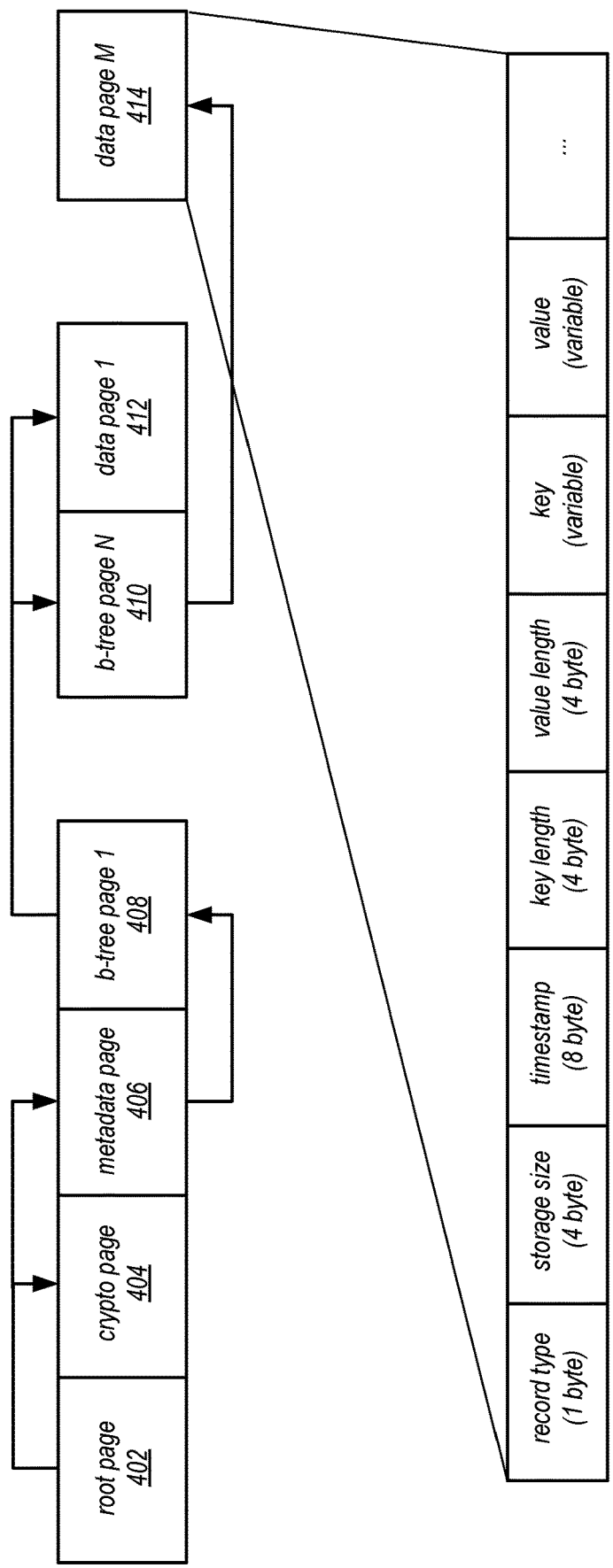
FIG. 4 is a logical block diagrams illustrating a file format and a data page that may be used in storing data file of the non-relational database backup stored in an external storage, according to some embodiments.

FIG. 4 is a logical block diagrams illustrating a file format and a data page that may be used in storing data file of the non-relational database backup stored in an external storage, according to some embodiments. In some embodiments, the backup may be stored in a row-oriented format for a schema-less data using log structured merge tree (LSM-T) with a copy-on-write loss structure. The data records of a files may be sorted and indexed by primary key and a timestamp. The sorting and indexing provided by such format enables efficient queries by key/key-range and timestamp and enables applications to execute a streamed merge of updates on read. Furthermore, in some embodiments, the primary key and timestamp for each record can be read without deserializing the rest of the record so that applications can deserialize as little data as possible when merging updates.

The logical block diagram of FIG. 4 illustrates the high-level contents of a file in the row-oriented format for a schema-less data with a copy-on-write loss structure. In some embodiments, a root page 402 may comprise metadata to locate a crypto page 404 and a metadata page 406. The crypto page 404 comprises metadata required to build a decryptor which decrypts and decompresses pages of the file except for the root page. The metadata page 406 may comprise miscellaneous metadata about the file including the location of a root b-tree page 408. In some embodiments, the root page 402 and the crypto the size of the page may be fixed and may always be located at the start of the file. In some embodiments, the b-tree page 408 may comprise an index of records by key and timestamp and may furthermore point to child b-tree page(s) 410 or data page(s) 412. In some embodiments, any data page, such as data page M 414, may comprise many small key/value records associated with the non-relational database items and may comprise various attributes such as record type, storage size, timestamp, key length, value length, key, value, etc.

The block diagram illustrated in FIG. 4 is described herein by way of example for a file format and a data page that may be used in storing data file of the non-relational database backup stored in an external storage, and the drawings and detailed description thereto are not intended to limit embodiments to the particular format disclosed, but on the contrary, the intention is to cover all modifications, equivalents and alternatives falling within the spirit and scope as defined by the file format. For example, although FIG. 4 illustrates a single b-tree page N 410 associated with a single data page M 414, other embodiments of the database file may contain more than one b-tree page/data page, as well as may contain different number of b-tree page/data page (e.g., a single b-tree page and multiple data pages). Moreover, in some embodiments, the order in which the different parts of the file format are laid out may be different.

Figure 5:
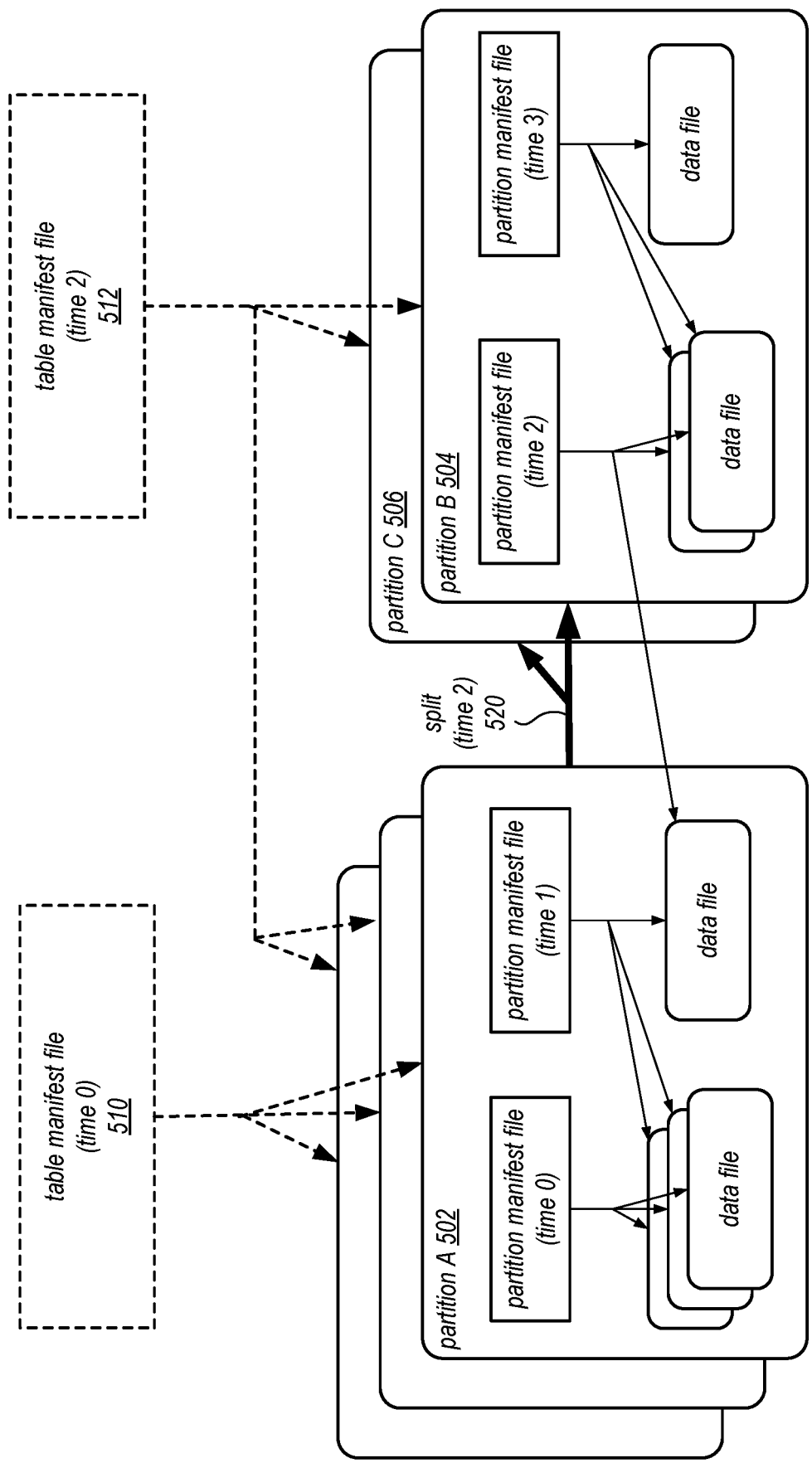
FIG. 5 is a logical block diagrams illustrating a non-relational database item collection format comprising collection manifest and partition manifest that may be used in storing data file of the non-relational database backup stored in an external storage, according to some embodiments.

FIG. 5 is a logical block diagrams illustrating a non-relational database item collection format comprising collection manifest and partition manifest that may be used in storing data file of the non-relational database backup stored in an external storage, according to some embodiments. In one sample embodiment of the non-relational database item collection format, a collection/table manifest file at time 0 510 may be comprised of three partitions and may be associated with a respective partition manifest file describing the locations of the data files. In some embodiments, a data file may comprise a run of data sorted by index key and timestamp. The table manifest may comprise a list of active partitions for a table as of a given time, and a new table manifest file is created whenever a partition of a table splits. The partition manifest may be data files that form an LSM-T of the state of the partition at a range of time. The manifest may reference a data file shared amongst other partition manifests if the data file is referenced by the partition manifest immediately preceding it.

For example, at time 1, the partition manifest file may update the data file while pointing to data files that were not changed at time 0. At time 2, the partition A 502 may be split 520 into partition B 504 and partition C 506. The updated table manifest file at time 2 512 may continue to point to the previous partitions at time 0 in addition to the partition B 504 and partition C 504 split at time 2. A partition manifest file at time 2 may point to data files at partition B 504 in addition to data file data file that the files at partition B were generated from in partition A 502. Partition manifest file at time 3 may continue to point to new data files that were updated in the newly split partition B 504. In some embodiments, instead of using collection manifest file, such as the collection manifest file at time 0 510 and at time 2 512, a metadata record may be updated for the respective partitions. In embodiments without table manifest files, the query engine may retrieve data that is asking for a key range by referencing the updated metadata record in a key range lookup.

FIG. 6 is a logical block diagram illustrating external query management of a non-relational database service that enables performance of queries to a non-relational database via a non-relational database backup hosted in an external data storage, according to some embodiments. In some embodiments a non-relational database service 210 may receive a query request 610 from an analytics service 284. The analytics service 284 may comprise query workers 632, a query coordinator 630, and query connector 628. The query coordinator 630 may be responsible for planning a query and the query workers 632 may be responsible for doing the actual query processing and data processing. These two components may communicate with the non-relational database service 210 using a query connector 628. The analytics service 284 may request operations such as get query request 610, get query statistics 614, and get query units 618. The external query management 218 may receive the query request 610 and attempt to split up the table copy into individual independent units of work that that can then be distributed across many query workers 632.

The query request 610 may provide a non-relational database identification information such as a table name. In some embodiments, if a table name is not named the analytics service destination may be assumed to be that of the requestor's identity. Upon valid query request 610 the non-relational database service 210 returns query id 612 wherein the query id is a unique identifier for the query associated with the query request 610. In some embodiments, based on the query id received, a get query statistics 614 request may be made to the non-relational database service 210. The non-relational database service 210 may return query statistics 616 to the analytics service 284. The statistic returned may comprise information such as the estimated size and item count for the table which can be used to plan the query and reserve capacity, in some embodiments.

Based on the query id received, a get query units 618 request may be made to the non-relational database service 210. The non-relational database service 210 may return a list of query units 620 to the analytics service 284. Based on the list of query units received, the query coordinator 630 may obtain a stream of items for the query unit via the query workers 632 in a parallel manner. In some embodiments, in order to obtain the list of query units, the external query management 218 may identify table-level compaction checkpoints 622 of the non-relational database backup 392 stored in the storage service 290. The table checkpoint may comprise pointers to and metadata regarding the set of freshest partition 604 checkpoints that covers the key-range of a table at a point-in-time. Based on the table-level checkpoints compaction checkpoints 624 may be returned and stored as metadata 216 of the non-relational database service 210.

Figure 7:
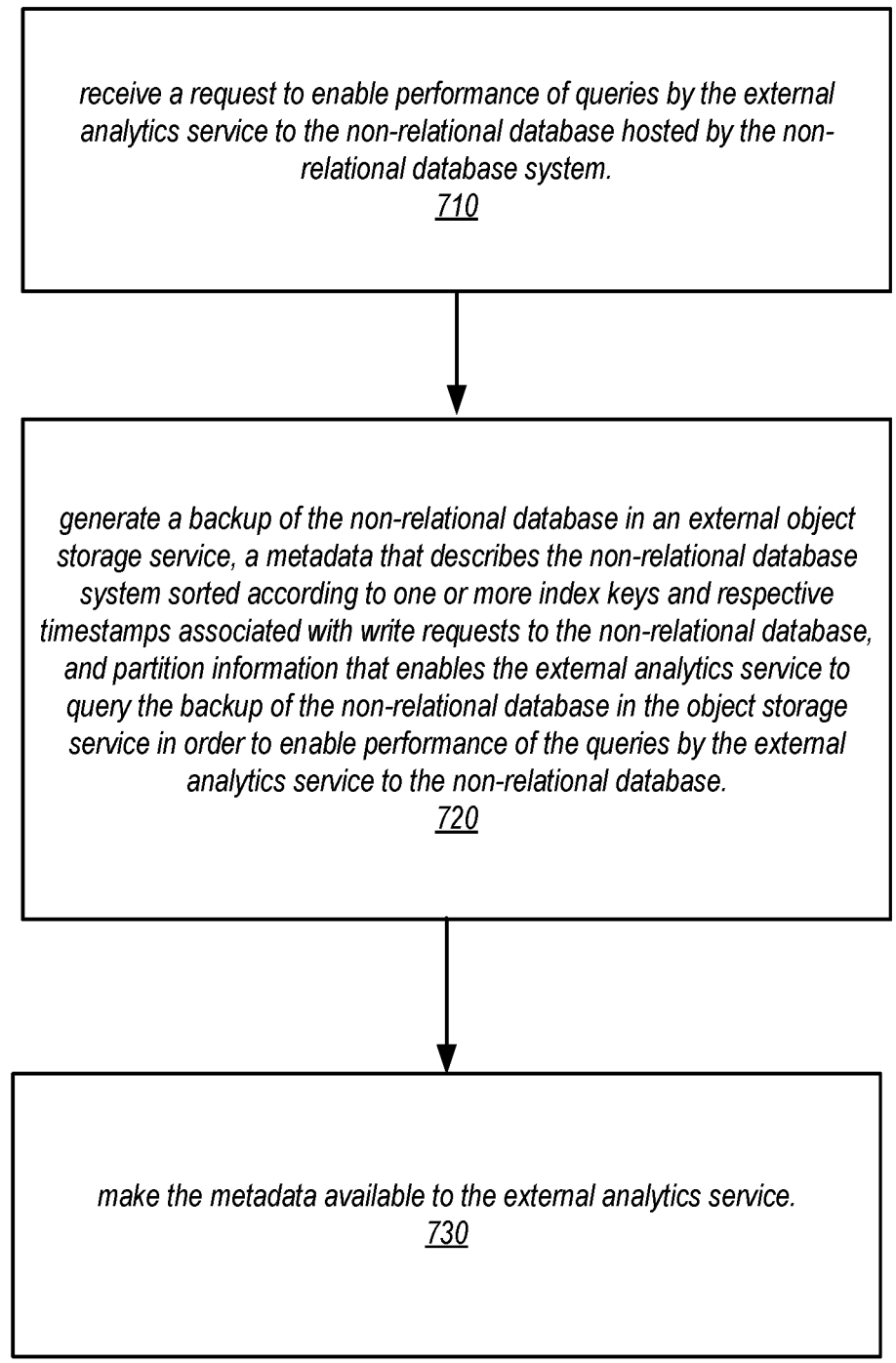
FIG. 7 is a high-level flowchart illustrating various methods and techniques to generate and maintain a backup of a non-relational database to enable external queries to the non-relational database, according to some embodiments.

FIG. 7 is a high-level flowchart illustrating various methods and techniques to generate and maintain a backup of a non-relational database to enable external queries to the non-relational database, according to some embodiments. These techniques, as well as the techniques discussed with regard to FIGS. 8-9, may be implemented using components or systems as described above with regard to FIGS. 2-7, as well as other types of databases, query engines, or systems, and thus the following discussion is not intended to be limiting as to the other types of systems that may implement the described techniques.

As indicated at 710, a request to enable performance of queries by the external analytics service to the non-relational database hosted by the non-relational database system may be received. In some embodiments, the request may be specified in a query language compatible with both a non-relational data model and a relational data model, in some embodiments. For example, SQL or other query languages that presume a structure, such as a pre-defined data schema for the data stored in the database (e.g., a number of columns with specified data types). In some embodiments, the query language may also support operations over data that is not structured, and thus stored without being stored in a pre-defined data format. For example, a query language may be SQL-compatible but also accept as parameters or inputs for operations over semi-structured data, nested data, and schema-less data, in addition to data stored a relational data format.

As indicated at 720, a backup of the non-relational database in an external object storage service, a metadata that describes the non-relational database system sorted according to one or more index keys, and respective timestamps associated with write requests to the non-relational database, and partition information that enables the external analytics service to query the backup of the non-relational database in the object storage service may be generated in order to enable performance of the queries by the external analytics service to the non-relational database, in some embodiments. As discussed in FIG. 4, in some embodiments, the primary key and timestamp for each record can be read without deserializing the rest of the record so that applications can deserialize as little data as possible when merging updates.

As indicated at 730, the metadata may be made available to the external query engine, in some embodiments. Alternatively, the metadata may be returned in a response to the access request (e.g., in a result for a query). In some embodiments, access to the database metadata may be provided by different types of APIs. For example, an API may be invoked to retrieve the metadata that may include partition information and query units which are individual independent units of work that that can be distributed across many of the query workers, as discussed in FIG. 1.

Figure 8:
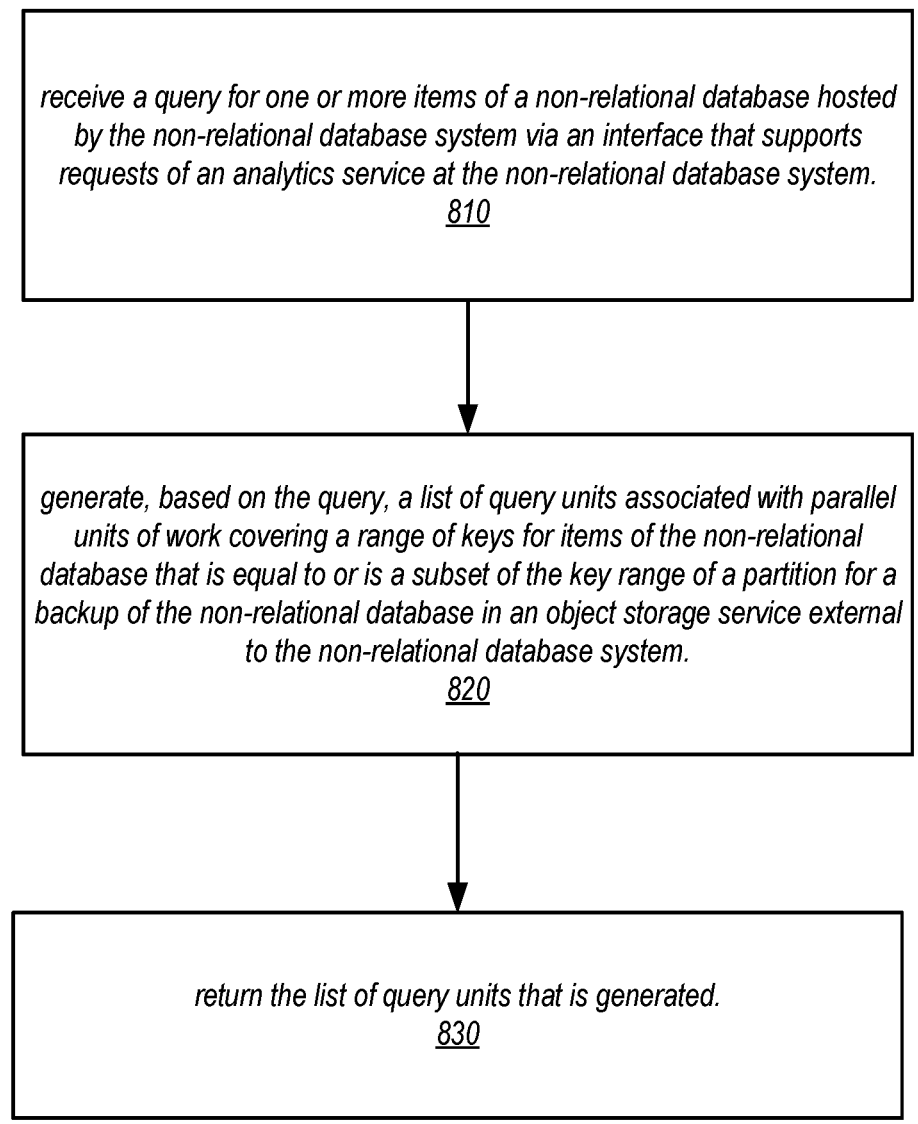
FIG. 8 is a high-level flowchart illustrating various methods and techniques to enable performance of queries to a non-relational database via a non-relational database backup hosted in an external data storage, according to some embodiments.

FIG. 8 is a high-level flowchart illustrating various methods and techniques to enable performance of queries to a non-relational database via a non-relational database backup hosted in an external data storage, according to some embodiments.

As indicated at 810, a query for one or more items of a non-relational database hosted by the non-relational database system may be received via an interface that supports requests of an analytics service at the non-relational database system. In some embodiments, the non-relational database service may receive an enable query request via a request or may allow a query management of the non-relational database service to receive a query, as discussed in FIG. 3.

As indicated at 820, a list of query units associated with parallel units of work covering a range of keys for items of the non-relational database that is equal to or is a subset of the key range of a partition for a backup of the non-relational database in an object storage service external to the non-relational database system may be generated based on the query. As indicated at 830, the list of query units that is generated may be returned, in some embodiments. In some embodiments, based on the list of query units received, a query coordinator of the analytics service may obtain a stream of items for the query unit via the query workers in a parallel manner.

Figure 9:
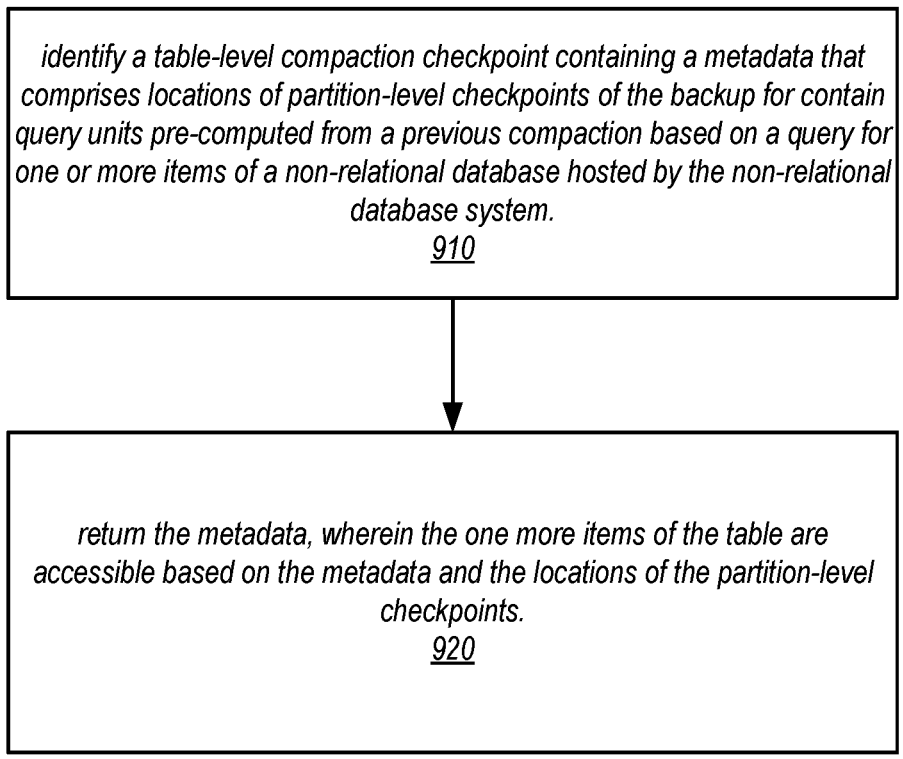
FIG. 9 is a high-level flowchart illustrating various methods and techniques to identify locations of partition-level checkpoints to enable performance of queries to a non-relational database, according to some embodiments.

FIG. 9 is a high-level flowchart illustrating various methods and techniques to identify locations of partition-level checkpoints to enable performance of queries to a non-relational database, according to some embodiments.

As indicated at 910 a table-level compaction checkpoint comprising a metadata that comprises locations of partition-level checkpoints of the backup for comprise query units pre-computed from a previous compaction based on a query for one or more items of a non-relational database hosted by the non-relational database system may be identified. In some embodiments, instead of a table-level compaction checkpoint, metadata record associated with the respective partitions may be used, as discussed in FIG. 5. As indicated at 920, the metadata, wherein the one more items of the table are accessible based on the locations of the partition-level checkpoints may be returned.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 10:
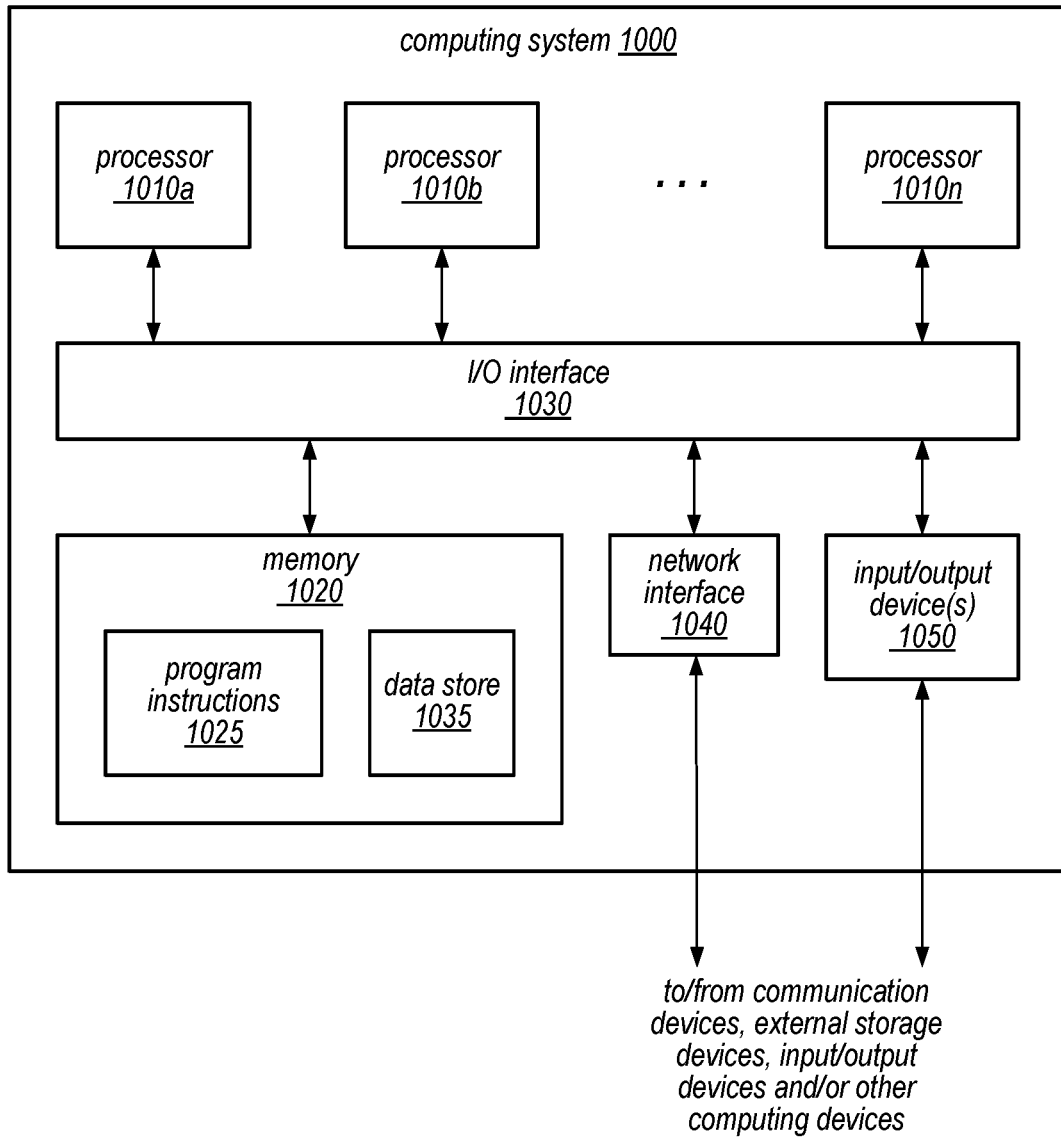
FIG. 10 is a block diagram illustrating an example computing system, according to some embodiments.

Embodiments to implement enabling queries to a backup of database as described herein may be implemented on one or more computer systems. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices, in one embodiment. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions, in one embodiment. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 1020 may store program instructions 1025 and/or data accessible by processor 1010, in one embodiment. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. A computer-accessible medium may include non-transitory storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040, in one embodiment.

In one embodiment, I/O interface 1030 may be coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000, in one embodiment. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000, in one embodiment. Multiple input/output devices 1050 may be present in computer system 1000 or may be distributed on various nodes of computer system 1000, in one embodiment. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, that implement the various embodiments of the systems as described herein, and data store 1035, comprising various data accessible by program instructions 1025, in one embodiment. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   one or more processors; and
   a memory, storing program instructions that when executed by the one or more processors, cause the one or more processors to implement a non-relational database service, the non-relational database service configured to:
      receive, via an interface of a non-relational database service that connects the non-relational database service with an external analytics service, a request to enable performance of queries by the external analytics service to the non-relational database hosted by the non-relational database service;
      enable performance of the queries by the external analytics service to the non-relational database, comprising:
         generate, by the non-relational database service, metadata for a backup of the non-relational database in an external object storage service, wherein the metadata describes:
            the non-relational database system sorted according to one or more index keys and respective timestamps associated with write requests to the non-relational database; and
            partition information that enables the external analytics service to query the backup of the non-relational database in the object storage service; and
         making the metadata available to the external analytics service.

2. The system of claim 1, wherein the non-relational database service is further configured to:
   store logs associated with write requests to the non-relational database in the object storage service, wherein respective ones of the logs are associated with respective time ranges; and
   perform horizontally distributed compaction of the logs into a single log associated with a single time range, wherein the backup of the non-relational database in the external data store is furthermore stored in a per-partition, log data structure able to perform horizontally distributed compaction.

3. The system of claim 2, wherein the log data structure is a log-structured merge-tree.

4. The system of claim 1, wherein the non-relational database service is further configured to:
   store logs associated with write requests to the non-relational database in the object storage service, wherein respective ones of the logs are associated with respective time ranges;
   perform horizontally distributed compaction of the logs and the backup of the non-relational database that is stored in the object storage service in a per-partition, log data structure able to perform horizontally distributed compaction, wherein the horizontally distributed compaction is performed upon determination that:
      a compute and storage cost of the performance of the compaction is offset by cost savings for performance of one or more subsequent queries on the backup, or
      a threshold target latency in performance of one or more subsequent queries on the backup would be breached without the performance of the compaction.

5. The system of claim 1, wherein the non-relational database service is further configured to:
   update the backup of the non-relational database based on a passage of a predetermined threshold of time regardless of whether a threshold volume of write requests has been met.

6. A method, comprising:
   receiving, via an interface of a non-relational database system that connects the non-relational database system with an external query engine, a request to enable performance of queries by the external query engine to the non-relational database hosted by the non-relational database system; and
   enabling performance of the queries by the external query engine to the non-relational database, comprising:
      generating, by the non-relational database system, metadata for a backup of the non-relational database in an external data store, wherein the metadata describes:
         backup of the non-relational database sorted according to one or more index keys and respective timestamps associated with write requests to the non-relational database;
         partition information that enables the external query engine to query the backup of the non-relational database in the data store; and
      making the metadata available to the external query engine.

7. The method of claim 6, further comprising:
storing logs associated with write requests to the non-relational database in the external data store, wherein respective ones of the logs are associated with respective time ranges; and
performing horizontally distributed compaction of the logs into a single log associated with a single time range, wherein the backup of the non-relational database in the external data store is furthermore stored in a per-partition log data structure able to perform horizontally distributed compaction.

8. The method of claim 7, wherein the log data structure is a log-structured merge-tree.

9. The method of claim 6, further comprising:
storing logs associated with write requests to the non-relational database in the external data store, wherein respective ones of the logs are associated with respective time ranges;
performing horizontally distributed compaction of the logs and the backup of the non-relational database that is stored in the external data store in a per-partition log data structure able to perform horizontally distributed compaction, wherein the horizontally distributed compaction is performed upon determination that:
a compute and storage cost of the performance of the compaction is offset by cost savings for performance of one or more subsequent queries on the backup, or
a threshold target latency in performance of one or more subsequent queries on the backup would be breached without the performance of the compaction.

10. The method of claim 6, further comprising:
updating the backup of the non-relational database based on a passage of a predetermined threshold of time regardless of whether a threshold volume of write requests has been met.

11. The method of claim 6, further comprising:
generating the backup of the non-relational database in the external data store, wherein generating the backup comprises:
reading change logs stored in the non-relational database system;
sorting the change logs to be sorted according to the one or more index keys and the respective timestamps associated with write requests to the non-relational database; and
storing the sorted change logs and producing a new partition file based on the sorted change logs, wherein the metadata comprises the new partition file.

12. The method of claim 11, further comprising:
reading the partition file, prior to the performing the compaction, to determine that a threshold non-relational database size is met; and
performing a horizontally distributed compaction of the copy according to the respective range of the one or more index keys upon the determination that the threshold non-relational database size is met.

13. The method of claim 11, further comprising:
identifying one or more portions of the backup that are not referenced by the partition file within a first threshold of time; and
deleting, subsequent to the compacting, the partition file upon determination that the age of the partition file has passed a second threshold of time.

14. The method of claim 6, wherein the non-relational database is in a row-oriented file format, and wherein the backup of the non-relational database is in a columnar file format.

15. One or more non-transitory, computer-readable storage media, storing program instructions that when executed on or across one or more computing devices cause the one or more computing devices to implement a non-relational database service that implements:
receiving, via an interface of a non-relational database system that connects the non-relational database system with an external query engine, a request to enable performance of queries by the external query engine to the non-relational database hosted by the non-relational database system; and
enabling performance of the queries by the external query engine to the non-relational database, comprising:
generating, by the non-relational database system, metadata for a backup of the non-relational database in an external data store, wherein the metadata describes:
backup of the non-relational database sorted according to one or more index keys and respective timestamps associated with write requests to the non-relational database;
partition information that enables the external query engine to query the backup of the non-relational database in the data store; and
making the metadata available to the external query engine.

16. The one or more non-transitory, computer-readable storage media of claim 15, wherein the non-relational database service further implements:
storing logs associated with write requests to the non-relational database in the external data store, wherein respective ones of the logs are associated with respective time ranges; and
performing horizontally distributed compaction of the logs into a single log associated with a single time range, wherein the backup of the non-relational database in the external data store is furthermore stored in a per-partition log data structure able to perform horizontally distributed compaction.

17. The one or more non-transitory, computer-readable storage media of claim 16, wherein the log data structure is a log-structured merge-tree.

18. The one or more non-transitory, computer-readable storage media of claim 15, wherein the non-relational database service further implements:
storing logs associated with write requests to the non-relational database in the external data store, wherein respective ones of the logs are associated with respective time ranges;
performing horizontally distributed compaction of the logs and the backup of the non-relational database that is stored in the external data store in a per-partition, log data structure able to perform horizontally distributed compaction, wherein the horizontally distributed compaction is performed upon determination that:
a compute and storage cost of the performance of the compaction is offset by cost savings for performance of one or more subsequent queries on the backup, or
a threshold target latency in performance of one or more subsequent queries on the backup would be breached without the performance of the compaction.

19. The one or more non-transitory, computer-readable storage media of claim 15, wherein the non-relational database service further implements:
  updating the backup of the non-relational database based on a passage of a predetermined threshold of time regardless of whether a threshold volume of write requests has been met.

20. The one or more non-transitory, computer-readable storage media of claim 15, wherein the non-relational database service further implements:
  generating the backup of the non-relational database in the external data store, wherein generating the backup comprises:
    reading change logs stored in the non-relational database system;
    sorting the change logs to be sorted according to the one or more index keys and the respective timestamps associated with write requests to the non-relational database; and
    storing the sorted change logs and producing a new partition file based on the sorted change logs, wherein the metadata comprises the new partition file.

* * * * *